US011297583B2

(12) United States Patent
Duan et al.

(10) Patent No.: US 11,297,583 B2
(45) Date of Patent: Apr. 5, 2022

(54) PREMIUM DEVICE-AIDED LOW-TIER DEVICE GROUP DELAY CALIBRATION FOR NR POSITIONING

(71) Applicant: QUALCOMM Incorporated, San Diego, CA (US)

(72) Inventors: Weimin Duan, San Diego, CA (US); Alexandros Manolakos, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 16/997,813

(22) Filed: Aug. 19, 2020

(65) Prior Publication Data

US 2021/0282100 A1 Sep. 9, 2021

(30) Foreign Application Priority Data

Mar. 3, 2020 (GR) ............................... 20200100119

(51) Int. Cl.
*H04W 56/00* (2009.01)
*H04L 12/26* (2006.01)
*H04W 24/08* (2009.01)
*H04L 43/0864* (2022.01)

(52) U.S. Cl.
CPC ..... *H04W 56/0015* (2013.01); *H04L 43/0864* (2013.01); *H04W 24/08* (2013.01)

(58) Field of Classification Search
CPC . H04W 56/0015; H04W 24/08; H04W 4/023; H04W 4/20; H04W 24/10; H04W 64/00; H04W 64/006; H04L 43/0864
See application file for complete search history.

(56) References Cited

U.S. PATENT DOCUMENTS

| 2012/0057481 | A1* | 3/2012 | Kim | ..................... H04W 56/009 370/252 |
| 2013/0301551 | A1* | 11/2013 | Ghosh | ..................... H04B 7/066 370/329 |
| 2014/0073352 | A1* | 3/2014 | Aldana | ..................... G01S 5/10 455/456.1 |
| 2015/0350946 | A1* | 12/2015 | Das | ..................... H04W 24/00 455/41.2 |
| 2015/0382143 | A1* | 12/2015 | Lindskog | ..................... H04W 4/023 455/456.1 |

(Continued)

OTHER PUBLICATIONS

International Search Report and Written Opinion—PCT/US2021/012750—ISA/EPO—dated May 4, 2021.

(Continued)

*Primary Examiner* — Hassan Kizou
*Assistant Examiner* — Hector Reyes
(74) *Attorney, Agent, or Firm* — Qualcomm Incorporated

(57) ABSTRACT

Techniques are provided for calibrating group delay for a low-tier UE by leveraging the relatively high accuracy of RTT positioning for a premium UE. This can enable online/in-field group delay calibration of low-tier UEs, allowing for low-tier UEs to be calibrated when needed. Depending on desired functionality, techniques for calibration may include the use of RTT measurements with a base station, or an RTT measurement between the low-tier UE and the premium UE.

23 Claims, 8 Drawing Sheets

(56) References Cited

U.S. PATENT DOCUMENTS

2018/0115439 A1* 4/2018 Bhatti .................. G01S 13/765

OTHER PUBLICATIONS

Qualcomm Incorporated: "On gNB Requirements for NR Positioning", 3GPP Draft, 3GPP TSG-RAN WG4 Meeting #94-e, R4-2000736, 3rd Generation Partnership Project (3GPP), Mobile Competence Centre, 650, Route Des Lucioles, F-06921 Sophia-Antipolis Cedex, France, vol. RAN WG4, No. Online, Feb. 24, 2020-Mar. 6, 2020, Feb. 14, 2020 (Feb. 14, 2020), XP051850707, 4 Pages, Retrieved from the Internet: URL: https://ftp.3gpp.org/tsg_ran/WG4_Radio/TSGR4_94_c/Docs/R4-2000736.zip. [retrieved on Feb. 14, 2020] figures 1, 2, 5 sections 1-3.

Qualcomm Incorporated: "On gNB Requirements for NR Positioning", 3GPP Draft, 3GPP TSG-RAN WG4 Meeting #93, R4-1915183, 3rd Generation Partnership Project (3GPP), Mobile Competence Centre, 650, Route Des Lucioles, F-06921 Sophia-Antipolis Cedex, France, vol. RAN WG4, No. Reno, NV, USA, Nov. 18, 2019-Nov. 22, 2019, Nov. 8, 2019 (Nov. 8, 2019), XP051819421, pp. 1-7, Retrieved from the Internet: URL: https://ftp.3gpp.org/tsg_ran/WG4_Radio/TSGR4_93/Docs/R4-1915183.zip, R4-1915183—On gNB-requirements for NR positioning.docx, [retrieved on Nov. 8, 2019], p. 5-p. 6.

* cited by examiner

US 11,297,583 B2

PREMIUM DEVICE-AIDED LOW-TIER DEVICE GROUP DELAY CALIBRATION FOR NR POSITIONING

CROSS-REFERENCES TO RELATED APPLICATIONS

This application claims the benefit of Greece Application No. 20200100119, filed Mar. 3, 2020, entitled "PREMIUM UE-AIDED LOW-TIER UE GROUP DELAY CALIBRATION FOR NR POSITIONING," which is assigned to the assignee hereof, and incorporated by reference herein in its entirety.

BACKGROUND

Determining the location of a mobile electronic device (also referred to herein as a User Equipment (UE)) using a cellular network may use signaling between the device and base stations of the cellular network. According to some techniques, Round-Trip-Time (RTT) measurements may be made to determine distances between the device and the base stations, from which the location of the device may be determined. But these measurements can suffer inaccuracy due to internal delays at the device.

BRIEF SUMMARY

Techniques described herein provide for calibrating group delay for a low-tier device by leveraging the relatively high accuracy of RTT positioning for a premium device. This can enable in-field group delay calibration of low-tier devices, allowing for low-tier devices to be calibrated when needed. Depending on desired functionality, techniques for calibration may include the use of RTT measurements with a base station, or an RTT measurement between the low-tier device and the premium device.

An example method of determining a group delay of a first mobile device, according to this description, comprises obtaining a first RTT measurement between the first mobile device and a base station, and identifying a second mobile device within a threshold distance of the first mobile device, wherein the second mobile device has a higher bandwidth than the first mobile device. The method further includes obtaining a second RTT measurement between the second mobile device and the base station, and determining a group delay of the first mobile device based on a difference between the first RTT measurement and the second RTT measurement.

Another example method of determining a group delay of a first mobile device, according to this description, comprises obtaining information indicative of a known distance between the first mobile device and a second mobile device, wherein the second mobile device has a higher bandwidth than the first mobile device and obtaining an RTT measurement between the first mobile device and the second mobile device. The method further includes determining a group delay of the first mobile device based on a difference between the known distance and a distance determined by the RTT measurement.

An example device, according to this description, comprises a transceiver, a memory, and one or more processing units communicatively coupled with the transceiver and the memory. The one or more processing units are configured to obtain a first RTT measurement between a first mobile device and a base station, and identify a second mobile device within a threshold distance of the first mobile device, wherein the second mobile device has a higher bandwidth than the first mobile device. The one or more processing units are also configured to obtain a second RTT measurement between the second mobile device and the base station, and determine a group delay of the first mobile device based on a difference between the first RTT measurement and the second RTT measurement.

An example mobile device, according to this description, comprises a transceiver, a memory, and one or more processing units communicatively coupled with the transceiver and the memory. The one or more processing units are configured to obtain information indicative of a known distance between a first mobile device and a second mobile device, wherein the second mobile device has a higher bandwidth than the first mobile device. The one or more processing units are also configured to obtain, using the transceiver, an RTT measurement between the first mobile device and the second mobile device, and determine a group delay of the first mobile device based on a difference between the known distance and a distance determined by the RTT measurement.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3, etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Fifth-Generation (5G) New Radio (NR) is a wireless radio frequency (RF) interface undergoing standardization by the 3rd Generation Partnership Project (3GPP). 5G NR is poised to offer enhanced functionality over previous generation (Long-Term Evolution (LTE)) technologies, such as significantly faster and more responsive mobile broadband, enhanced conductivity through Internet of Things (IoT) devices, and more. Additionally, 5G NR enables new positioning techniques for UEs, including Angle of Arrival (AoA)/Angle of Departure (AoD) positioning, UE-based positioning, and multi-cell RTT positioning. With regard to RTT positioning, this involves taking RTT measurements between the UE and multiple base stations.

Figure 1:
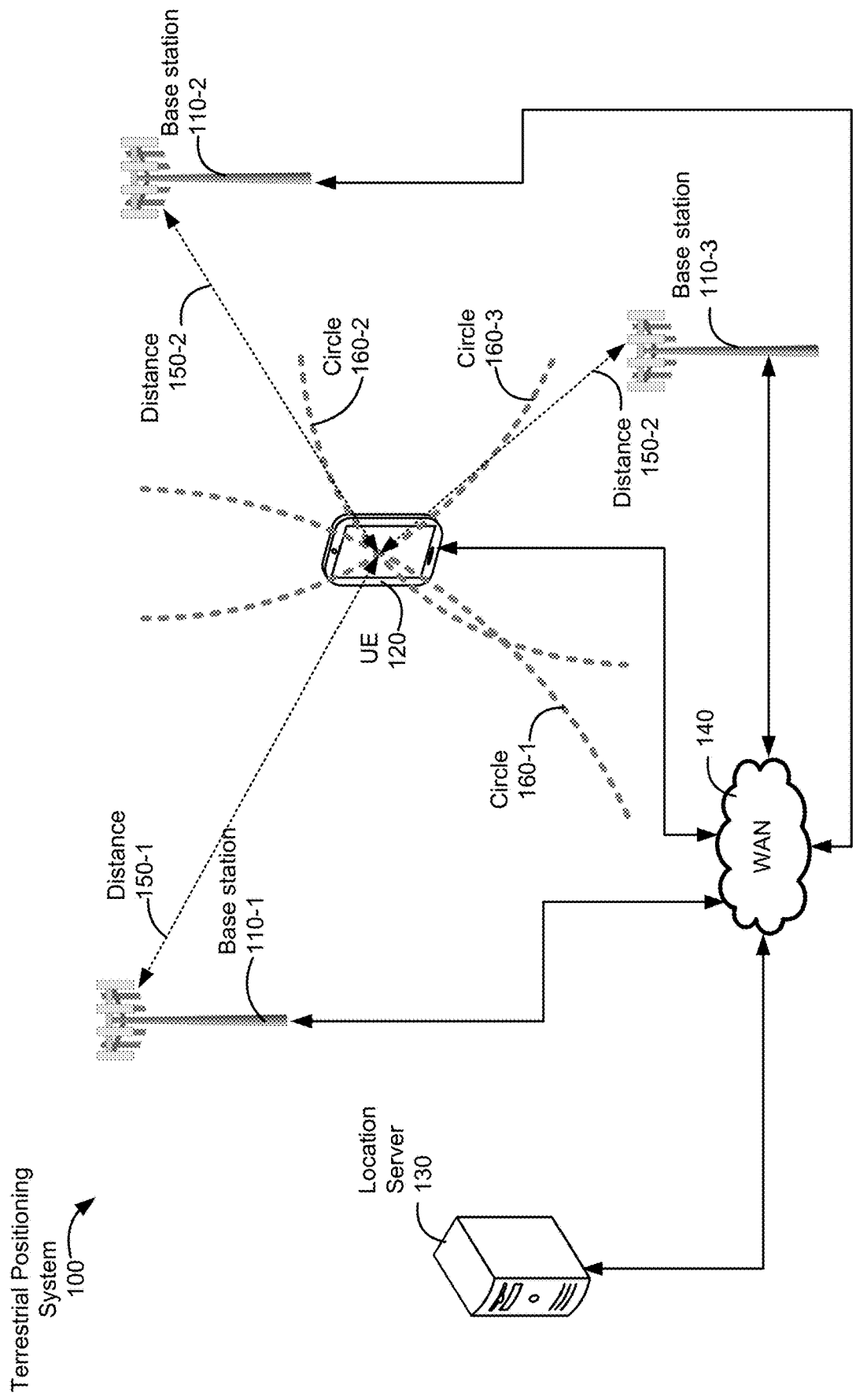
FIG. 1 is a diagram of a terrestrial positioning system, according to an embodiment.

FIG. 1 is a diagram of a terrestrial positioning system 100, according to an embodiment. Here, the terrestrial positioning system comprises multiple cellular transceivers, or base stations 110-1, 110-2, and 110-3 (generically and collectively referred to herein as base stations 110), which are used to determine the location (e.g., in geographical coordinates) of a UE 120. The base stations 110 and/or the UE 120 both may be communicatively coupled with a location server 130 via a Wide Area Network (WAN) 140, which may comprise a network of the cellular carrier, as well as other data communication networks, as discussed in more detail below. (Solid arrows between components indicate communication links.) Although the UE 120 may be communicatively coupled with the WAN 140 via wireless communication with one or more of the base stations 110, the UE 120 may have an additional or alternative communication link to the WAN 140, as illustrated.

It should be noted that FIG. 1 provides a generalized illustration of various components, any or all of which may be utilized as appropriate, and each of which may be duplicated or omitted as necessary. Specifically, although one UE 120 is illustrated, it will be understood that many UEs (e.g., hundreds, thousands, millions, etc.) may utilize the terrestrial positioning system 100. Similarly, the terrestrial positioning system 100 may include a larger or smaller number of base stations 110, location servers 130, and/or other components. The illustrated communication links that communicatively connect the various components in the terrestrial positioning system 100 include data and signaling connections, which may include additional (intermediary) components, direct or indirect physical (wired) and/or wireless connections, and/or additional networks. Furthermore, components may be rearranged, combined, separated, substituted, and/or omitted, depending on desired functionality.

The UE 120, as used herein, may be an electronic device and may be referred to as a device, a mobile device, a wireless device, a mobile terminal, a terminal, a wireless terminal, a mobile station (MS), a Secure User Plane Location (SUPL)-Enabled Terminal (SET), or as some other name. Moreover, UE 120 may correspond to a cellphone, smartphone, laptop, tablet, personal data assistant (PDA), wearable device (e.g., smart watch), tracking device, or some other portable or moveable device. In some cases, a UE 120 may be part of some other entity, for example, may be a chipset supporting a modem that is integrated into some larger mobile entity such as a vehicle, drone, package, shipment, or robotic device. Typically, though not necessarily, the UE 120 may support wireless communication using one or more Radio Access Technologies (RATs) (e.g., in addition to 5G NR), such as Global System for Mobile communication (GSM), Code Division Multiple Access (CDMA), Wideband CDMA (WCDMA), LTE, High Rate Packet Data (HRPD), IEEE 802.11 Wi-Fi, Bluetooth® (BT), Worldwide Interoperability for Microwave Access (WiMAX), etc. The UE 120 may also support wireless communication using a Wireless Local Area Network (WLAN) which may connect to other networks (e.g. the Internet) using a Digital Subscriber Line (DSL) or packet cable, for example. The WAN 140 may comprise such wireless communication networks and/or technologies.

The UE 120 may include a single entity or may include multiple entities such as in a personal area network where a user may employ audio, video, and/or data input/output (I/O) devices and/or body sensors and a separate wireline or wireless modem. An estimate of a location of the UE 120 may be referred to as a location, location estimate, location fix, fix, position, position estimate, or position fix, and may be geodetic, thus providing location coordinates for the UE 120 (i.e., latitude and longitude) which may or may not include an altitude component (e.g., height above sea level, height above or depth below ground level, floor level or basement level). Alternatively, a location of the UE 120 may be expressed as a civic location (e.g., as a postal address or the designation of some point or small area in a building such as a particular room or floor). A location of the UE 120 may also be expressed as an area or volume (defined either geodetically or in civic form) within which the UE 120 is expected to be located with some probability or confidence level (e.g., 67%, 95%, etc.). A location of the UE 120 may further be a relative location comprising, for example, a distance and direction or relative X and Y (and, optionally, Z) coordinates defined relative to some origin at a known location which may be defined geodetically, in civic terms, or by reference to a point, area, or volume indicated on a map, floor plan, or building plan. In the description contained herein, the use of the term "location" may comprise any of these variants unless indicated otherwise. When computing the location of a UE, it is common to solve for local X, Y, and possibly Z coordinates and then, if needed, convert the local coordinates into absolute ones (e.g., for latitude, longitude, and altitude above or below mean sea level).

As noted, depending on desired functionality, the WAN 140 may comprise any of a variety of wireless and/or wireline communication networks. The WAN 140 can, for example, comprise any combination of public and/or private networks, local and/or wide-area networks, and the like. Furthermore, the WAN 140 may utilize one or more wired and/or wireless communication technologies. In some embodiments, the WAN 140 may comprise a cellular or other mobile network, a WLAN, a Wireless Wide-Area Network (WWAN), and/or the Internet, for example. Particular examples of a WAN 140 include a 5G NR network, an LTE network, a Wi-Fi WLAN, and the like. WAN 140 may also include more than one network and/or network type.

Base stations 110 may comprise nodes in a cellular network, which may allow the UE 120 to communicate wirelessly with other devices linked to the WAN 140. The base stations 110 may have known locations, and may therefore be used for positioning as described herein. As described in further detail below, techniques are not necessarily limited to fixed base stations (i.e., base stations having a fixed position), but may also include mobile base stations and even other UEs 120. For 5G NR, the base stations 110 may comprise a next-generation Node B (gNB). A WAN 140 comprising additional or alternative RATs may include base stations 110 comprising a node B, an Evolved Node B (eNodeB or eNB), a base transceiver station (BTS), a radio base station (RBS), a Next-Generation eNB (ng-eNB), a Wi-Fi access point (AP), and/or a BT AP. Thus, UE 120 can send and receive information with network-connected devices, such as location server 130, by accessing the WAN 140. And, as noted, the UE 120 may access the WAN 140 via a base station 110. Base stations 110 and/or base station antennas may be referred to as Transmission Reception Points (TRPs).

The location server 130 may comprise a server and/or other computing device configured to determine an estimated location of UE 120 and/or provide data (e.g., assistance data) to UE 120 to facilitate the location determination. According to some embodiments, location server 130 may comprise an SUPL Location Platform (SLP), which may support the SUPL user plane (UP) location solution defined by the Open Mobile Alliance (OMA) and may support location services for UE 120 based on subscription information for UE 120 stored in location server 130. The location server 130 may also comprise an Enhanced Serving Mobile Location Center (E-SMLC) that supports location of UE 120 using a control plane (CP) location solution for LTE radio access by UE 120. The location server 130 may further comprise a Location Management Function (LMF) that supports location of UE 120 using a CP location solution for 5G NR radio access by UE 120. In a CP location solution, signaling to control and manage the location of UE 120 may be exchanged between elements of WAN 140 and with UE 120 using existing network interfaces and protocols and as signaling from the perspective of WAN 140. In a UP location solution, signaling to control and manage the location of UE 120 may be exchanged between location server 130 and UE 120 as data (e.g., data transported using the Internet Protocol (IP) and/or Transmission Control Protocol (TCP)) from the perspective of WAN 140.

It can be further noted that, in some embodiments of a terrestrial positioning system 100, the location server 130 may be executed by and/or incorporated into the UE 120 itself. That is, in the embodiments described herein, the functionality of the location server 130 may be performed by the UE 120. In such instances, communication between the UE and location server may therefore occur between hardware and/or software components of the UE 120. Similarly, the functions of the location server 130 described herein may be performed by a base station 110 or other device communicatively coupled to the terrestrial positioning system 100.

Additionally, positioning of the UE 120 can be "UE-based" or "network-based." UE-based positioning comprises the UE 120 determining its own location, which may be facilitated by information provided to the UE 120 by the network (e.g., the location server 130 and/or base stations 110). Network-based positioning comprises the network (e.g., the location server 130) determining the location of the UE, which may be facilitated by information provided to the network by the UE 120. The techniques for RTT-based positioning provided herein may apply to either UE-based or network-based positioning. For example, for UE-based positioning, RTT measurements may be initiated by and/or communicated to the UE 120, which, if provided the location of the base stations 110 from which RTT measurements were taken, can determine its own location. For network-based positioning, RTT measurements may be initiated by and/or communicated to one or more base stations 110, which may send the measurements to the location server 130, which can then determine the location of the UE 120.

The terrestrial positioning system 100 can determine the location of the UE 120 by exploiting both downlink (DL) information transmitted by base stations 110 and uplink (UL) information transmitted by the UE 120. As explained in more detail below, certain positioning methods can use RTT to determine the location of the UE 120 by determining one or more distances 150 from base stations 110, then using multilateration or similar algorithms to determine the position of the UE 120. In multilateration, for example, distances 150-1, 150-2, and 150-3 trace respective circles 160-1, 160-2, and 160-3 (only portions of which are shown in FIG. 1), and the location of the UE 120 may be determined as the intersection of these circles 160. Alternative positioning methods may use a combination of distance information from one or more RTT measurements with angle information (e.g., AoA, AoD). An illustration of how distance can be determined using RTT is shown in FIG. 2.

Figure 2:
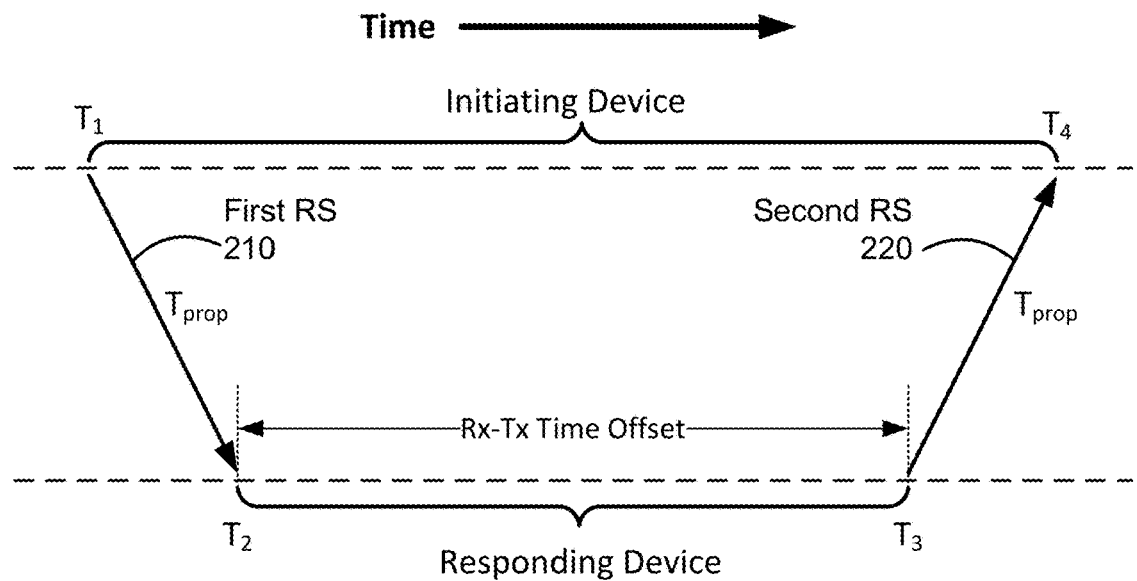
FIG. 2 is a timing diagram illustrating the basic steps of an RTT measurement, according to an embodiment.

FIG. 2 is a timing diagram illustrating the basic steps of an RTT measurement, with which a position of a UE 120 can be determined, and which may be utilized in the embodiments provided herein, as described in more detail below. Here, an initiating device transmits a first Reference Signal (RS) 210 at a first time, $T_1$, which propagates to a responding device. At a second time, $T_2$, the first RS 210 arrives at the responding device. The Over-The-Air (OTA) delay (i.e., the propagation time it takes for the first RS 210 to travel from the initiating device to the responding device) is $T_{prop}$. The responding device then transmits a second RS 220 at a third time, $T_3$. Finally, the second RS 220 is received and measured by the initiating device at a fourth time, $T_4$. As with the first RS 210, the OTA delay of the second RS 220 is $T_{prop}$.

Here, which devices comprise the initiating device and responding device may vary, depending on desired functionality. That is, in some instances, the UE 120 may be the initiating device, and a base station 110 may be the responding device. In other instances, the base station 110 may be the initiating device, and the UE 120 may be the responding device. Again, this may depend on whether the terrestrial positioning system 100 is performing UE-based positioning or network-based positioning. Additionally, as indicated in embodiments provided herein below, there may be instances in which RTT measurements are taken between two different UEs. Thus, the initiating device may be a first UE, and the responding device may be a second UE.

The RTT measurement shown in FIG. 2 may be used to determine a distance, d, between the initiating and responding devices. This can be determined using the following equation:

$$\frac{2d}{c} = (T_4 - T_1) - (T_3 - T_2) = (T_4 - T_1) + (T_2 - T_3). \tag{1}$$

(As will be appreciated, distance, d, divided by the speed of RF propagation, c, equals the propagation delay, $T_{prop}$.) Thus, a precise determination of the distance between the initiating device and responding device can be made.

The precision with which times $T_1$, $T_2$, $T_3$, and $T_4$ are measured, however, can be a limiting factor to the precision of the distance determination made by the RTT measurement. The accuracy of the determination of the total time between $T_2$ and $T_3$, known as the "Rx-Tx time offset," can influence the precision of the distance determination. And with 5G NR's promise of increased capabilities, it is important that these times are measured accurately. This can be especially true for low-tier UEs, which have a reduced operating bandwidth compared with premium UEs.

As used herein, the term "low-tier UE" or "low-tier device" refers to a wireless device (UE) having a relatively low operating bandwidth, as compared with a "premium UE" or "premium device," which has a relatively high operating bandwidth. Low-tier UEs may also be called "reduced-capability" UEs. Examples of low-tier UEs can include wearable devices (e.g., smart watches), relaxed/narrowband IoT devices, low-end mobile phones, and the like. The current operating bandwidth of these devices is roughly 5-20 megahertz (MHz), although some low-tier UEs may have a higher or lower operating bandwidth. Examples of premium UEs may comprise high-end mobile phones (e.g., smart phones), tablets, vehicles, and the like. Premium UEs currently operate at a bandwidth of 100 MHz or more. Generally speaking, low-tier UEs have a relatively lower bandwidth (e.g., less than 100 MHz), lower processing capabilities, and/or lower power budgets than premium UEs. Importantly, while the group delay of premium UEs is often accurately determined (e.g., using proprietary calibration techniques), it may be more difficult to determine the group delay of low-tier UEs. This can impact the accuracy of RTT measurements.

Figure 3:
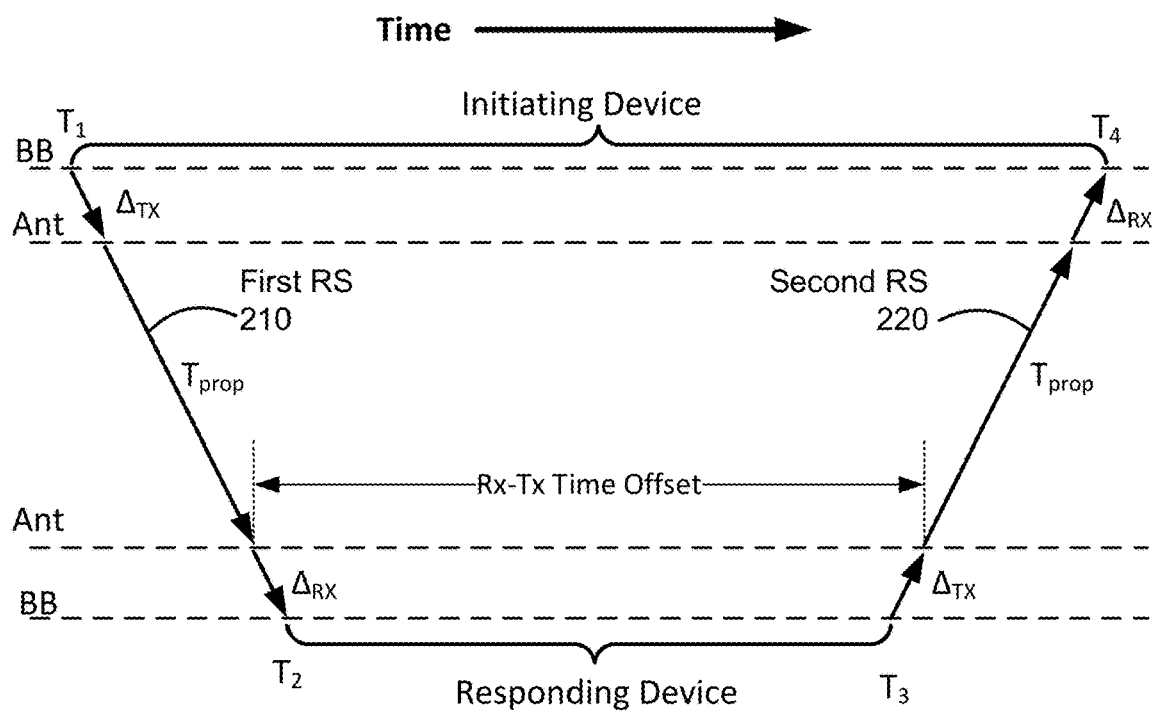
FIG. 3 is a timing diagram illustrating how group delay can impact the accuracy of RTT measurements.

FIG. 3 is a timing diagram illustrating how group delay can impact the accuracy of RTT measurements. Group delay in this context refers to the time it takes an outgoing (TX) signal to travel from baseband processing circuitry ("BB" in FIG. 3) to the antenna ("Ant") of a device, or the time it takes an incoming (RX) signal to travel from the antenna to the baseband processing circuitry. (In a typical UE design, there may be one or more analog components between the baseband processing circuitry and the antenna.) As can be seen in FIG. 3, initiating device and responding device each have a respective total group delay of $\Delta_{RX}+\Delta_{TX}$ (which may be different for each device) that can impact the RTT measurement. For example, Rx-Tx time offset (the total time between the responding device's receipt of the first RS 210 and transmission of the second RS 220) is not simply $T_3-T_2$, but $T_3-T_2$ plus the group delay ($\Delta_{RX}+\Delta_{TX}$) of the responding device.

The impact of group delay can be significant. For example, delay of a single nanosecond can result in an error of two feet, resulting in limited precision of the determined location of the UE. This, in turn, can limit the number of applications for which location determination can be used. And, as noted, although the group delay for premium UEs is often determinable using proprietary means, the group delay for low-tier UEs is often not determinable using similar techniques. Moreover, because of the lower operating bandwidth of low-tier UEs, it may result in lower accuracy for calibration. (A 100 MHz premium UE would have a resolution of 10 nanoseconds (ns), whereas a 20 MHz low-tier UE would have a resolution of 50 ns.) Further complicating this issue is the fact that group delay can vary over time (e.g., it may vary across different operating temperatures), and therefore may not be determined by the manufacturer.

Embodiments provided herein solve these and other issues by providing techniques for calibrating low-tier UEs to accurately account for group delay by leveraging the relatively high accuracy of RTT positioning for premium UEs. This can enable online/in-field group delay calibration of low-tier UEs, allowing for low-tier UEs to be calibrated when needed. Depending on desired functionality, different techniques for calibration may be used. When properly calibrated, a low-tier UE can provide an accurate Rx-Tx time offset to account for group delay.

Figure 4:
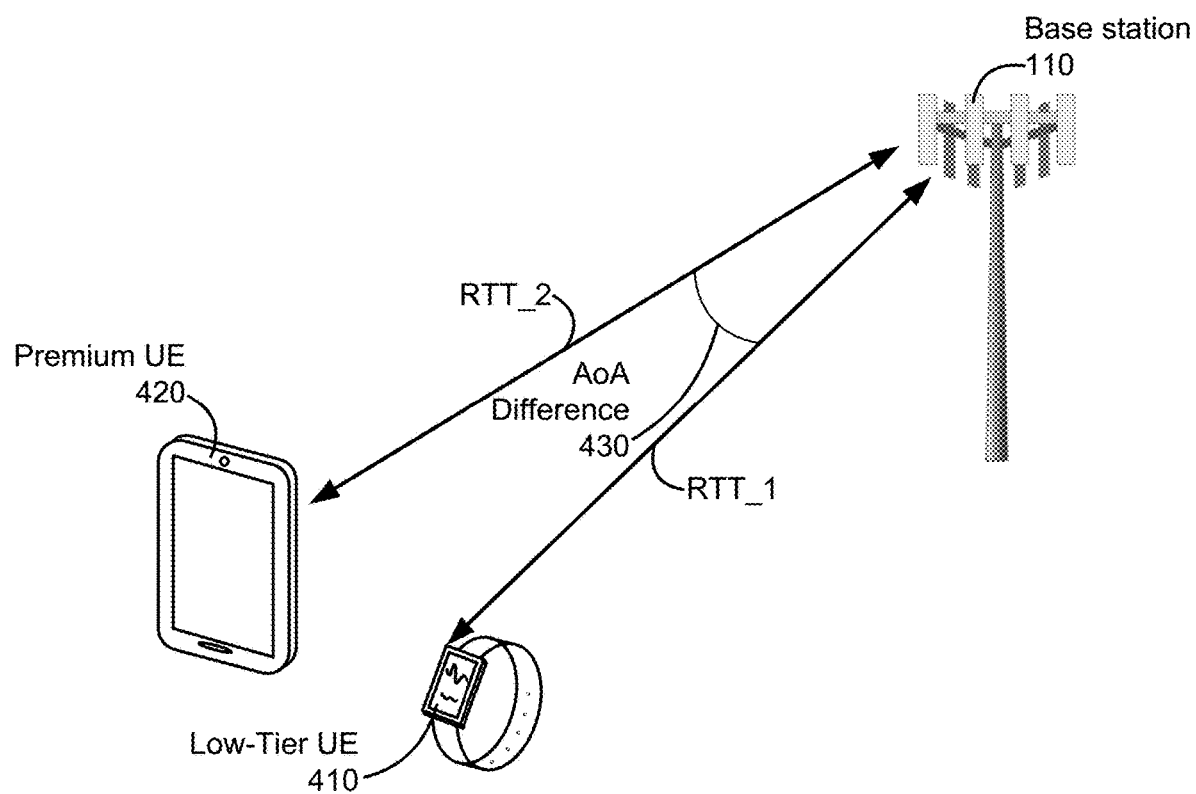
FIG. 4 is a diagram of a first technique for group delay calibration of a low-tier device, according to an embodiment.

FIG. 4 is a diagram of a first technique for group delay calibration of a low-tier UE, according to an embodiment. Here, the technique involves using a base station 110. In short, according to this technique, where a low-tier UE 410 is located near a premium UE 420, a first RTT measurement (RTT_1) is taken between the base station 110 and the low-tier UE 410, a second RTT measurement (RTT_2) is taken between the base station 110 and the premium UE 420, and then the two RTT measurements (RTT_1 and RTT_2) are compared to determine the group delay of the low-tier UE 410. (Because RTT_1 and RTT_2 should be approximately the same, the difference, therefore, can be attributed to the group delay of the low-tier UE 410.)

The effectiveness of this technique can depend on the co-location of the low-tier UE 410 and premium UE 420. That is, to accurately determine the group delay of the low-tier UE 410, the low-tier UE 410 and premium UE 420 should be substantially the same distance from the base station 110, such that the two RTT measurements should be substantially the same.

Any variety of techniques may be employed for choosing the premium UE 420 to use in this technique. In many instances, for example, the low-tier UE 410 may already be in communication with the premium UE 420 (e.g., via direct communications, such as "sidelink" in LTE and NR standards). A simple example of this would be the low-tier UE 410 comprising a smart watch worn by a user who was also carrying a premium UE 420 comprising a mobile phone. Some embodiments may enable a user to select a premium UE 420 to use for calibration. This can include enabling the user of the low-tier UE 410 to select from a list of premium UEs 420 in the approximate area of the low-tier UE 410, as determined by the terrestrial positioning system 100. Additionally or alternatively, the low-tier UE 410 may conduct a search for nearby premium UEs 420 (e.g., using RF signaling to conduct a scan of available premium UEs 420). Other embodiments may do this automatically (e.g., based on a premium UE 420 determined to be the closest to the low-tier UE 410 from among a plurality of premium UEs 420, or a premium UE 420 being within a threshold distance from the low-tier UE 410, as determined by the terrestrial positioning system 100).

Some embodiments may leverage AoA capabilities of the base station 110 to help determine a premium UE 420 to use for calibration. For example, a 5G NR base station 110 (e.g., a gNB) may be capable of performing AoA measurements to determine which premium UEs 420 are near the low-tier UE 410. A premium UE 420 may then be selected if the AoA difference 430 (e.g., the difference between the AoA of the premium UE 420 and the AoA of the low-tier UE 410, from the perspective of the base station 110) is within a certain threshold and/or the premium UE 420 has the smallest AoA difference 430 from a plurality of candidate premium UEs 420. Additionally or alternatively, if the AoA difference 430 is still above a threshold minimum, the terrestrial positioning system 100 may conduct triangulation and/or another form of location determination of the premium UE 420, to accommodate this offset in the location of the premium UE 420 and the low-tier UE 410. This offset can then be accounted for when conducting the two RTT measurements, to help ensure the accuracy of the group delay determination for the low-tier UE 410.

The initiation of the RTT measurements and/or the determination of the group delay for the low-tier UE 410 may be executed a variety of ways, depending on desired functionality. In some instances, for example (e.g., for network-based positioning), the base station 110 may initiate the RTT measurements and compare the RTT measurements to determine the group delay. In some embodiments, the base station 110 may further provide the determined group delay to the low-tier UE 410 for future use (e.g., during a window of time in which the determined group delay may be considered valid). In some instances, the low-tier UE 410 may initiate the first RTT measurement (RTT_1). In such instances, the second RTT measurement (RTT_2) may be initiated by the base station 110 (e.g., in response to taking the first RTT measurement) or premium UE 420 (e.g., in response to direct or indirect communications from the low-tier UE 410), then provided to the low-tier UE 410 by the base station 110 or premium UE 420 for determination of the group delay. (Once the low-tier UE 410 determines its group delay, it can, for example, then perform UE-based positioning.) According to some embodiments, the group delay may be reported back to the terrestrial positioning system 100, which may then account for the group delay in subsequent network-based positioning of the low-tier UE 410. (In some embodiments, the group delay of the low-tier UE 410 may be determined by or communicated to the premium UE 420, which can then relay the group delay to the base station 110. This way of communicating the group delay of the low-tier UE 410 may be preferable in certain instances, given that the premium UE 420 likely has a higher power budget than the low-tier UE 410.)

Figure 5:
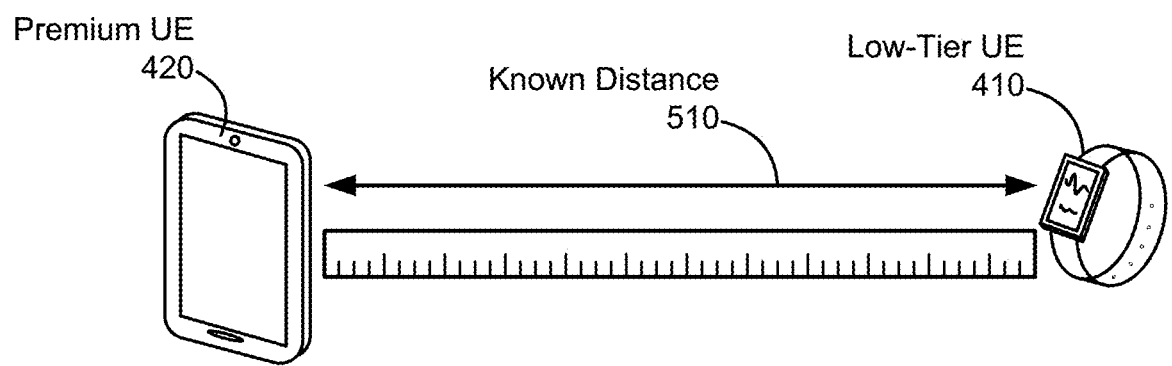
FIG. 5 is a diagram of a second technique for group delay calibration of a low-tier device, according to an embodiment.

FIG. 5 is a diagram of a second technique for group delay calibration of a low-tier UE, according to an embodiment, which may be used in addition or as an alternative to the first technique illustrated in FIG. 4 and described above. Unlike the first technique, the technique illustrated in FIG. 5 does not involve a base station 110, but instead takes an RTT measurement at a known distance 510 to be able to determine the group delay of the low-tier UE 410. That is, according to this technique, an RTT measurement is made by the premium UE 420 and low-tier UE 410 while the premium UE 420 and low-tier UE 410 are situated at a known distance 510 from each other. Because they are at a known distance 510 (and because the group delay of the premium UE 420 is known and accounted for), any difference between the known distance 510 and distance derived from the RTT measurement may be attributed to an inaccuracy in the determination of the group delay for the low-tier UE 410. The group delay of the low-tier UE 410 may then be recalibrated to ensure accurate RTT measurements. According to some embodiments, the group delay may be reported back to the terrestrial positioning system 100, which may then account for the group delay in subsequent network-based positioning of the low-tier UE 410.

The technique illustrated in FIG. 5 may be conducted in any of a variety of ways. According to some embodiments, a user of the low-tier UE 410 may be guided through a process for making this calibration using, for example, a user interface of the low-tier UE 410 and/or premium UE 420. Some embodiments may allow the user to confirm that the premium UE 420 and low-tier UE 410 have been accurately placed via user input (e.g., the press of a button on a touchscreen display of the premium UE 420 or low-tier UE 410). In some embodiments, the user may be able to locate the premium UE 420 and low-tier UE 410 at a desired distance, then provide the distance (e.g., the known distance 510) via a user input. Additionally or alternatively, the user interface of the low-tier UE 410 and/or premium UE 420 may tell the user the distance at which to locate the premium UE 420 and low-tier UE 410. (In some embodiments, the user may then confirm that the UEs have been placed at the appropriate distance.)

According to some embodiments, the RTT measurements between the premium UE 420 and low-tier UE 410 may be made, for example, using protocols for UE-based positioning based on communication with other UEs, as provided in 5G NR. In some embodiments, for example, this may involve utilizing a Channel State Information Reference Signal (CSI-RS), which can be transmitted for Channel Quality Information (CQI) purposes in sidelink for the purpose of positioning. In this case both UEs may transmit a CSI-RS inside a Physical Sidelink Shared Channel (PSSCH), and the receiving UE can measure the corresponding group delay.

Figure 6:
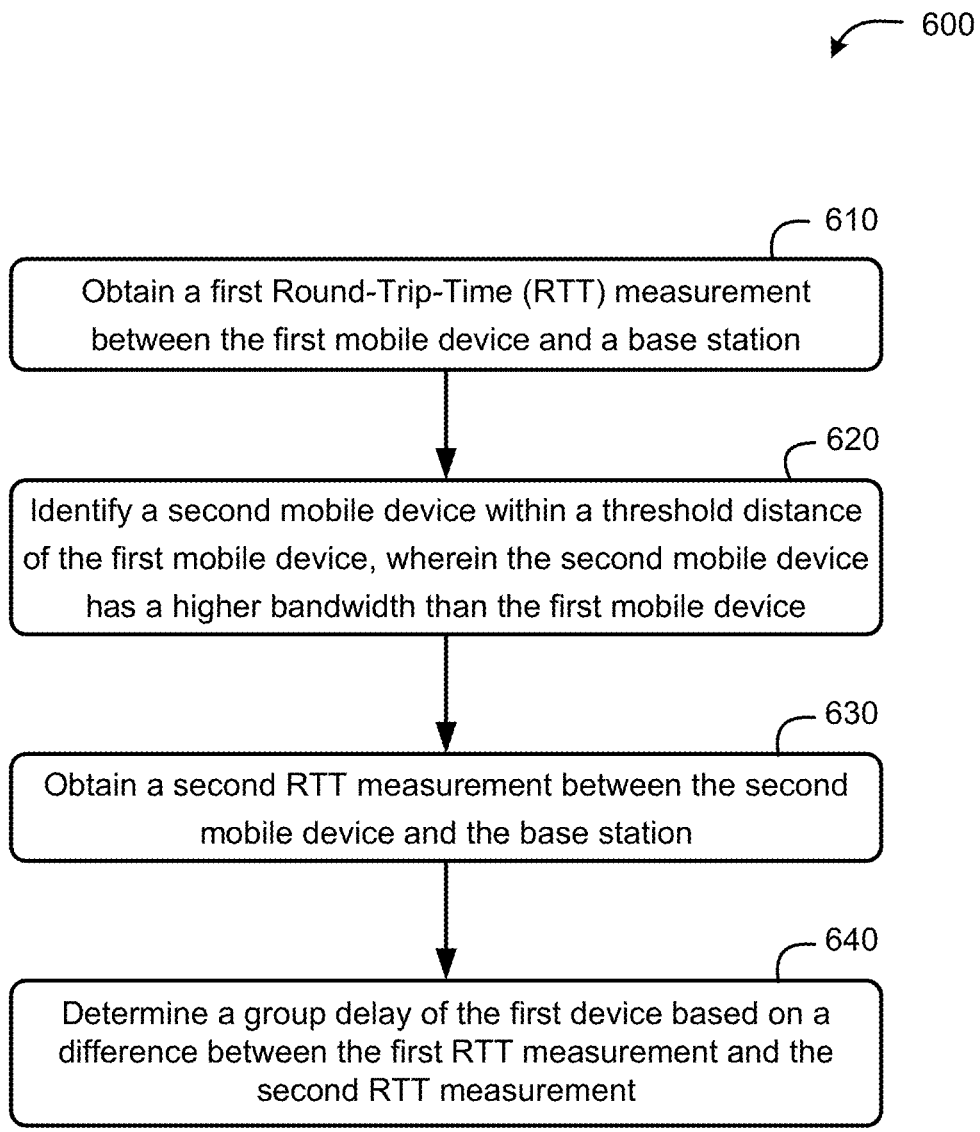
FIG. 6 is a flow diagram of a method of determining the group delay of a first device (e.g., a low-tier device), according to an embodiment utilizing a base station.

FIG. 6 is a flow diagram of a method 600 of determining the group delay of a first mobile device (e.g., a low-tier UE), according to an embodiment utilizing a base station. The method 600, therefore, may be seen as a method of performing the calibration previously described with regard to FIG. 4. As noted in the embodiments previously described, the initiation of RTT measurements and/or determination of delay for the first mobile device may be performed by one or more different devices. As such, the functionality shown in the blocks of FIG. 6 may be performed by the first mobile device, a second mobile device (e.g., a premium UE), and/or the base station. Further, means for performing the functionality of method 600 may include hardware and/or software components of a mobile device (e.g., UE illustrated in FIG. 8), and/or hardware and/or software components of the base station 110 illustrated in FIG. 9, both of which are described in more detail below. Additionally, it can be noted that, as with other figures appended hereto, FIG. 6 is provided as a non-limiting example. Other embodiments may vary, depending on desired functionality. For example, the functional blocks illustrated in method 600 may be combined, separated, or rearranged to accommodate different embodiments.

At block 610, the functionality comprises obtaining a first RTT measurement between the first mobile device and a base station. As noted, the RTT measurement itself may be initiated by the base station or first mobile device, depending on desired functionality. Moreover, in some embodiments, the measurement may be obtained by a device other than the device initiating the RTT measurement (e.g., the first mobile device may take the measurement and send it to the base station, or the base station may take the measurement and send it to the first mobile device). Means for performing the functionality at block 610 may comprise software and/or hardware components of a UE, such as the bus 805, processing unit(s) 810, DSP 820, wireless communication interface 830, memory 860, and/or other components of the UE 120 illustrated in FIG. 8 and described in more detail below. Additionally or alternatively, means for performing the functionality at block 610 may comprise software and/or hardware components of a base station, such as the bus 905, processing unit(s) 910, DSP 920, wireless communication interface 930, memory 960, and/or other components of the base station 110 illustrated in FIG. 9 and described in more detail below.

The functionality at block 620 comprises identifying a second mobile device within a threshold distance of the first mobile device, wherein the second mobile device has a higher bandwidth than the first mobile device. In some embodiments, the first mobile device comprises a low-tier UE having a bandwidth of less than 100 MHz, and the second mobile device comprises a premium UE having a bandwidth of 100 MHz or more.

As indicated in the previously described embodiments, identifying the second mobile device may comprise any of a variety of techniques. In some embodiments, identifying the second mobile device comprises determining that a difference between a first AoA measurement by the base station of the first mobile device and a second AoA measurement by the base station of the second mobile device is within a threshold value. Additionally or alternatively, the first mobile device may perform a scan and allow a user to select a desired second mobile device with which to perform calibration. As such, according to some embodiments, identifying the second mobile device may comprise performing a scan by the first mobile device. Moreover, identifying may further comprise receiving a user selection of a premium device from a list of a plurality of devices detected from the scan.

Means for performing the functionality at block 620 may comprise software and/or hardware components of a UE, such as the bus 805, processing unit(s) 810, DSP 820, wireless communication interface 830, memory 860, and/or other components of the UE 120 illustrated in FIG. 8 and described in more detail below. Additionally or alternatively, means for performing the functionality at block 620 may comprise software and/or hardware components of a base station, such as the bus 905, processing unit(s) 910, DSP 920, wireless communication interface 930, memory 960, and/or other components of the base station 110 illustrated in FIG. 9 and described in more detail below.

At block 630, the functionality comprises obtaining a second RTT measurement between the second mobile device and the base station. Again, the RTT measurement itself may be initiated by the base station or second mobile device, depending on desired functionality. Further, in some embodiments, the RTT measurement may be sent from one device to another (e.g., from UE to base station or vice versa). Means for performing the functionality at block 630 may comprise software and/or hardware components of a UE, such as the bus 805, processing unit(s) 810, DSP 820, wireless communication interface 830, memory 860, and/or other components of the UE 120 illustrated in FIG. 8 and described in more detail below. Additionally or alternatively, means for performing the functionality at block 630 may comprise software and/or hardware components of a base station, such as the bus 905, processing unit(s) 910, DSP 920, wireless communication interface 930, memory 960, and/or other components of the base station 110 illustrated in FIG. 9 and described in more detail below.

At block 640, the functionality comprises determining a group delay of the first mobile device based on a difference between the first RTT measurement and the second RTT measurement. As previously noted, because the group delay of the second mobile device may be known and accounted for, this allows for determination of the group delay of the first mobile device. And again, the base station, first mobile device, or second mobile device may make this determination of the group delay using the obtained first and second RTT measurements. In instances in which the first mobile device determines the group delay, the first mobile device may further send information indicative of the determined group delay to the base station (e.g., for use in network-based positioning of the first mobile device). In some embodiments, the first mobile device can be calibrated to account for group delay. And thus, the information indicative of the determined group delay can include, for example, the Rx-Tx time offset, accounting for the determined group delay. To preserve power, the first mobile device may send the determined group delay to the second mobile device, and the second mobile device may send the information indicative of the determined group delay to the base station. In instances in which the second mobile device determines the group delay, the second mobile device may further send the information indicative of the determined group delay to the base station and/or first mobile device. In instances in which the base station determines the group delay, the base station may send the information indicative of the group delay to the first mobile device (e.g., for use in UE-based positioning of the first mobile device).

Means for performing the functionality at block 640 may comprise software and/or hardware components of a UE, such as the bus 805, processing unit(s) 810, DSP 820, wireless communication interface 830, memory 860, and/or other components of the UE 120 illustrated in FIG. 8 and described in more detail below. Additionally or alternatively, means for performing the functionality at block 640 may comprise software and/or hardware components of a base station, such as the bus 905, processing unit(s) 910, DSP 920, wireless communication interface 930, memory 960, and/or other components of the base station 110 illustrated in FIG. 9 and described in more detail below.

Figure 7:
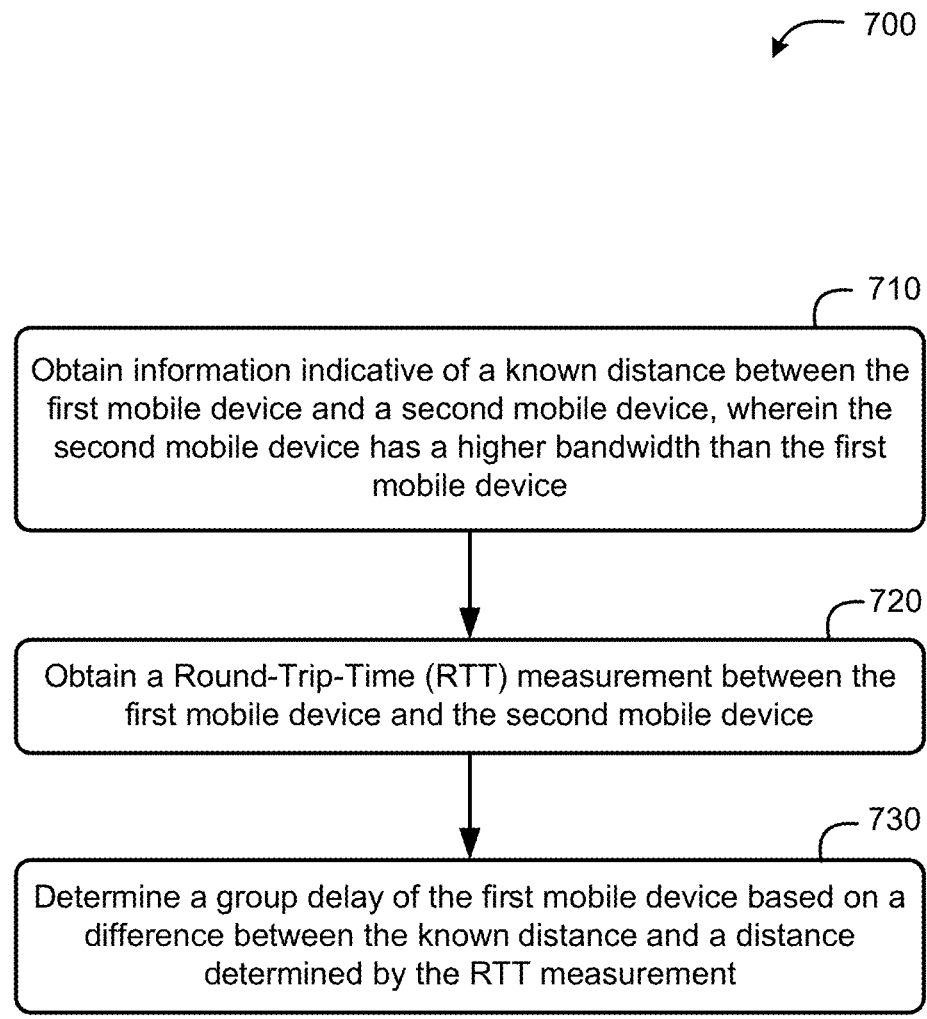
FIG. 7 is a flow diagram of a method of determining the group delay of a first device (e.g., a low-tier device), according to an embodiment that uses direct communications with a second device (e.g., a premium device).

FIG. 7 is a flow diagram of a method 700 of determining the group delay of a first mobile device (e.g., a low-tier UE), according to an embodiment that uses direct communications with a second mobile device (e.g., a premium UE). The method 700, therefore, may be seen as a method of performing the calibration previously described with regard to FIG. 5. As noted in the embodiments previously described, the initiation of RTT measurements and/or determination of delay for the first mobile device may be performed by either the first or second mobile device. As such, means for performing the functionality of method 700 may include hardware and/or software components of the UE illustrated in FIG. 8. Additionally, it can be noted that, as with figures appended hereto, FIG. 7 is provided as a non-limiting example. Other embodiments may vary, depending on desired functionality. For example, the functional blocks illustrated in method 700 may be combined, separated, or rearranged to accommodate different embodiments.

The functionality at block 710 comprises obtaining information indicative of a known distance between the first mobile device and the second mobile device, wherein the second mobile device has a higher bandwidth than the first mobile device. In some embodiments, the first mobile device comprises a low-tier UE having a bandwidth of less than 100 MHz, and the second mobile device comprises a premium-tier UE having a bandwidth of 100 MHz or more. Again, according to embodiments, this information may be obtained using a guided process in which the first and/or second mobile device guides a user into positioning each mobile device such that there is a known distance between the first mobile device and the second mobile device. Thus, according to embodiments, obtaining information indicative of the known distance between the first mobile device and the second mobile device may comprise receiving user input of a distance between the first mobile device on the second mobile device, receiving user input verifying that the first mobile device and second mobile device have been placed at a requested distance, or the like. Means for performing the functionality at block 710 may comprise software and/or hardware components of a UE, such as the bus 805, processing unit(s) 810, DSP 820, input device(s) 870, output device(s) 815, wireless communication interface 830, memory 860, and/or other components of the UE 120 illustrated in FIG. 8 and described in more detail below.

At block 720, the functionality comprises obtaining an RTT measurement between the first mobile device and the second mobile device. As noted in the embodiments above, this may involve utilizing a sidelink channel (e.g., utilizing CSI-RS confined within a PSSCH transmission). Additionally or alternatively, the RTT measurement may be taken in response to user input. More specifically, the RTT measurement may be performed in response to receiving a user input comprising information confirming that the first mobile device and the second mobile device are located the known distance apart. (Depending on desired functionality, the first mobile device may be the initiating device and the second mobile device may be the responding mobile device, or vice versa. In either case, the RTT measurement may be provided to the device determining the group delay of the first mobile device.) Means for performing the functionality at block 720 may comprise software and/or hardware components of a UE, such as the bus 805, processing unit(s) 810, DSP 820, wireless communication interface 830, memory 860, and/or other components of the UE 120 illustrated in FIG. 8 and described in more detail below.

The functionality at block 730 comprises determining a group delay of the first mobile device based on a difference between the known distance and a distance determined by the RTT measurement. A difference between the known distance and a distance determined using the RTT measurement may be indicative of the group delay ($\Delta_{RX}+\Delta_{TX}$) of the first mobile device (or an error in a current group delay estimate for the first mobile device). The first mobile device can then be calibrated accordingly to account for the determined group delay. For example, if a distance derived from the RTT measurement is two feet longer than the known distance, the group delay is approximately 1 ns. Alternatively, if a current group delay estimate was accounted for the RTT measurement, this would mean the current group delay estimate is 1 ns shorter than it should be, and the group delay estimate can be adjusted accordingly. Again, this determination may be made by either the first mobile device or the second mobile device, and information indicative of this determination may be reported to the network (e.g., via a base station) for subsequent network-based positioning using RTT measurements of the first mobile device.

Figure 8:
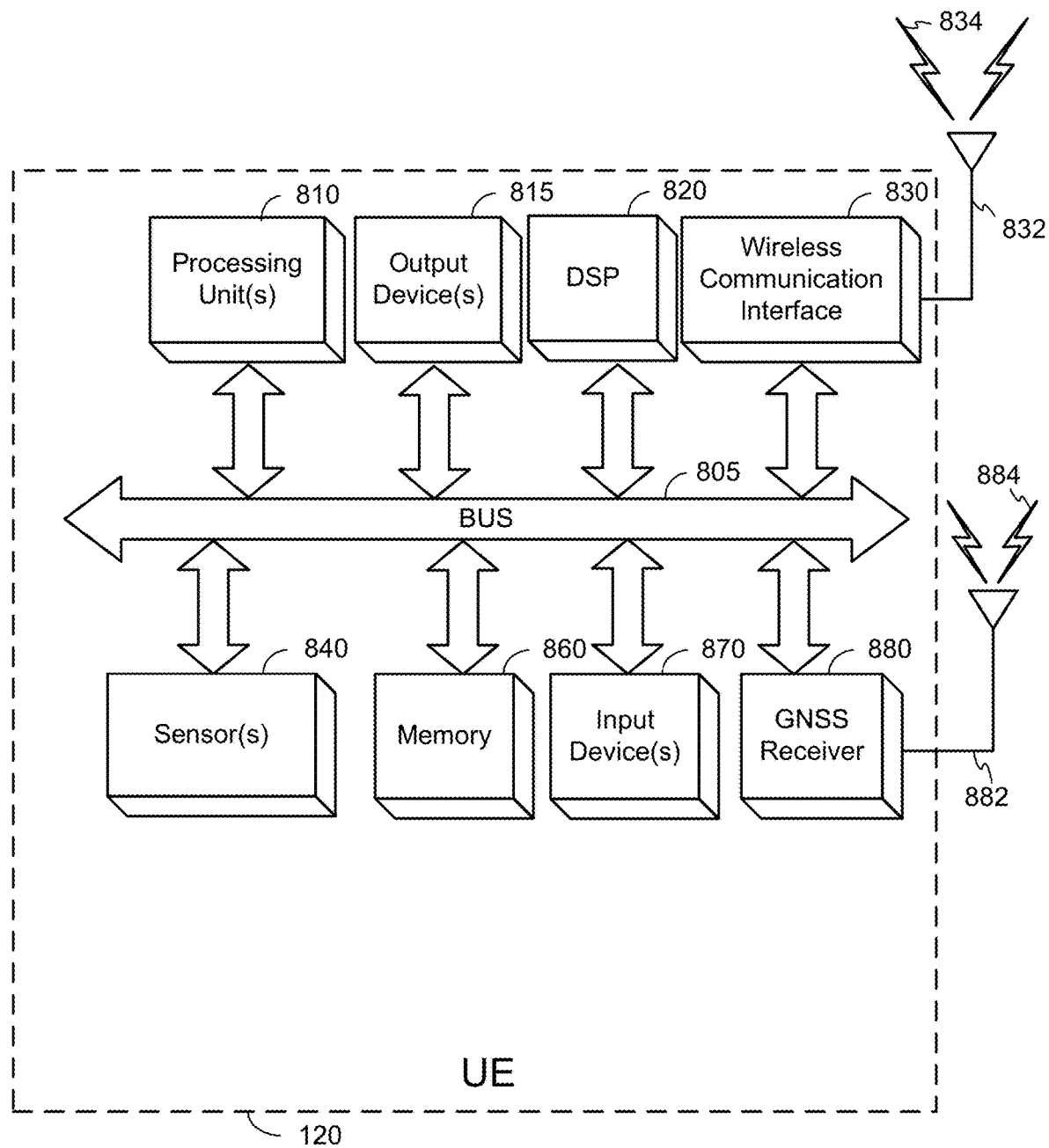
FIG. 8 is block diagram of an embodiment of a device.

Means for performing the functionality at block 730 may comprise software and/or hardware components of a UE, such as the bus 805, processing unit(s) 810, DSP 820, wireless communication interface 830, memory 860, and/or other components of the UE 120 illustrated in FIG. 8.

FIG. 8 is a block diagram of an embodiment of a UE 120, which can be utilized as described in the embodiments described herein and in association with FIGS. 1-7. Specifically, the UE 120 of FIG. 8 may correspond to any type of UE (e.g., low-tier and/or premium) discussed in the embodiments above, including the UE 120 of FIG. 1 and/or either or both of the low-tier UE 410 and premium UE 420 of FIGS. 4 and 5. It should be noted that FIG. 8 is meant only to provide a generalized illustration of various components of UE 120, any or all of which may be utilized as appropriate. In other words, because UEs can vary widely in functionality, they may include only a portion of the components shown in FIG. 8. A premium UE, for example, may include more of the components shown in FIG. 8 than does a low-tier UE. It can be noted that, in some instances, components illustrated by FIG. 8 can be localized to a single physical device and/or distributed among various networked devices, which may be disposed at different physical locations.

The UE 120 is shown comprising hardware elements that can be electrically coupled via a bus 805 (or may otherwise be in communication as appropriate). The hardware elements may include a processing unit(s) 810 which may comprise, without limitation, one or more general-purpose processors, one or more special-purpose processors (such as digital signal processing (DSP) chips, graphics acceleration processors, application-specific integrated circuits (ASICs), and/or the like), and/or other processing structure or means, which can be configured to perform one or more of the methods described herein. As shown in FIG. 8, some embodiments may have a separate DSP 820, depending on desired functionality. The UE 120 also may comprise one or more input devices 870, which may comprise, without limitation, one or more touchscreens, touchpads, microphones, buttons, dials, switches, and/or the like; and one or more output devices 815, which may comprise, without limitation, one or more displays, light-emitting diodes (LEDs), speakers, and/or the like.

The UE 120 might also include a wireless communication interface 830, which may comprise, without limitation, a modem, a network card, an infrared communication device, a wireless communication device, and/or a chipset (such as a BT device, an IEEE 802.11 device, an IEEE 802.15.4 device, a Wi-Fi device, a WiMAX™ device, cellular communication facilities, etc.), and/or the like, which may enable the UE 120 to communicate via the networks (e.g., via a base station) described herein with regard to FIG. 1. The wireless communication interface 830 may permit data to be communicated with a network, base stations (e.g., eNBs, ng-eNBs, and/or gNBs), and/or other TRPs, network components, computer systems, and/or any other electronic devices described herein. The communication can be carried out via one or more wireless communication antenna(s) 832 that send and/or receive wireless signals 834.

Depending on desired functionality, the wireless communication interface 830 may comprise separate base stations to communicate with base stations (e.g., eNBs, ng-eNBs, and/or gNBs) and other terrestrial base stations, such as wireless devices and APs. The UE 120 may communicate with different data networks that may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more RATs, such as cdma2000, WCDMA, and so on. Cdma2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, NR, and so on. 5G, LTE, LTE Advanced, NR, GSM, and WCDMA are described in documents from 3GPP. Cdma2000 is described in documents from a consortium named "3rd Generation Partnership Project 2" (3GPP2). 3GPP and 3GPP2 documents are publicly available. A WLAN may also be an IEEE 802.11x network, and a wireless personal area network (WPAN) may be a BT network, an IEEE 802.15x, or some other type of network. The techniques described herein may also be used for any combination of WWAN, WLAN, and/or WPAN.

The UE 120 can further include sensor(s) 840. Such sensors may comprise, without limitation, one or more inertial sensors (e.g., accelerometer(s), gyroscope(s), and or other Inertial Measurement Units (IMUs)), camera(s), magnetometer(s), compass, altimeter(s), microphone(s), proximity sensor(s), light sensor(s), barometer, and the like, some of which may be used to complement and/or facilitate the functionality described herein.

Embodiments of the UE 120 may also include a Global Navigation Satellite System (GNSS) receiver 880 capable of receiving signals 884 from one or more GNSS satellites using an GNSS antenna 882 (which may be combined in some implementations with antenna(s) 832). Such positioning can be utilized to complement and/or incorporate the techniques described herein. The GNSS receiver 880 can extract a position of the UE 120, using conventional techniques, from GNSS satellites of a GNSS system, such as Global Positioning System (GPS), Galileo, GLObal NAvigation Satellite System (GLONASS), Compass, Quasi-Zenith Satellite System (QZSS) over Japan, Indian Regional Navigation Satellite System (IRNSS) over India, BeiDou Navigation Satellite System (BDS) over China, and/or the like. Moreover, the GNSS receiver 880 can use various augmentation systems (e.g., a Satellite-Based Augmentation System (SBAS)) that may be associated with or otherwise enabled for use with one or more global and/or regional navigation satellite systems. By way of example, but not limitation, an SBAS may include an augmentation system(s) that provides integrity information, differential corrections, and so on, such as Wide Area Augmentation System (WAAS), European Geostationary Navigation Overlay Service (EGNOS), Multi-functional Satellite Augmentation System (MSAS), GPS-Aided GEO-Augmented Navigation or GPS and GEO-Augmented Navigation system (GAGAN), and/or the like. Thus, as used herein, a GNSS may include any combination of one or more global and/or regional navigation satellite systems and/or augmentation systems, and GNSS signals may include GNSS, GNSS-like, and/or other signals associated with such one or more GNSS.

The UE 120 may further include and/or be in communication with a memory 860. The memory 860 may comprise, without limitation, local and/or network-accessible storage, a disk drive, a drive array, an optical storage device, a solid-state storage device (such as a random access memory (RAM) and/or a read-only memory (ROM)), which can be programmable, flash-updateable, and/or the like. Such storage devices may be configured to implement any appropriate data stores, including, without limitation, various file systems, database structures, and/or the like.

The memory 860 of the UE 120 also can comprise software elements (not shown), including an operating system, device drivers, executable libraries, and/or other code, such as one or more application programs, which may comprise computer programs provided by various embodiments, and/or may be designed to implement methods and/or configure systems, provided by other embodiments, as described herein. Merely by way of example, one or more procedures described with respect to the functionality discussed above might be implemented as code and/or instructions executable by the UE 120 (e.g., using processing unit(s) 810). In an aspect, then, such code and/or instructions can be used to configure and/or adapt a general-purpose computer (or other device) to perform one or more operations in accordance with the described methods.

Figure 9:
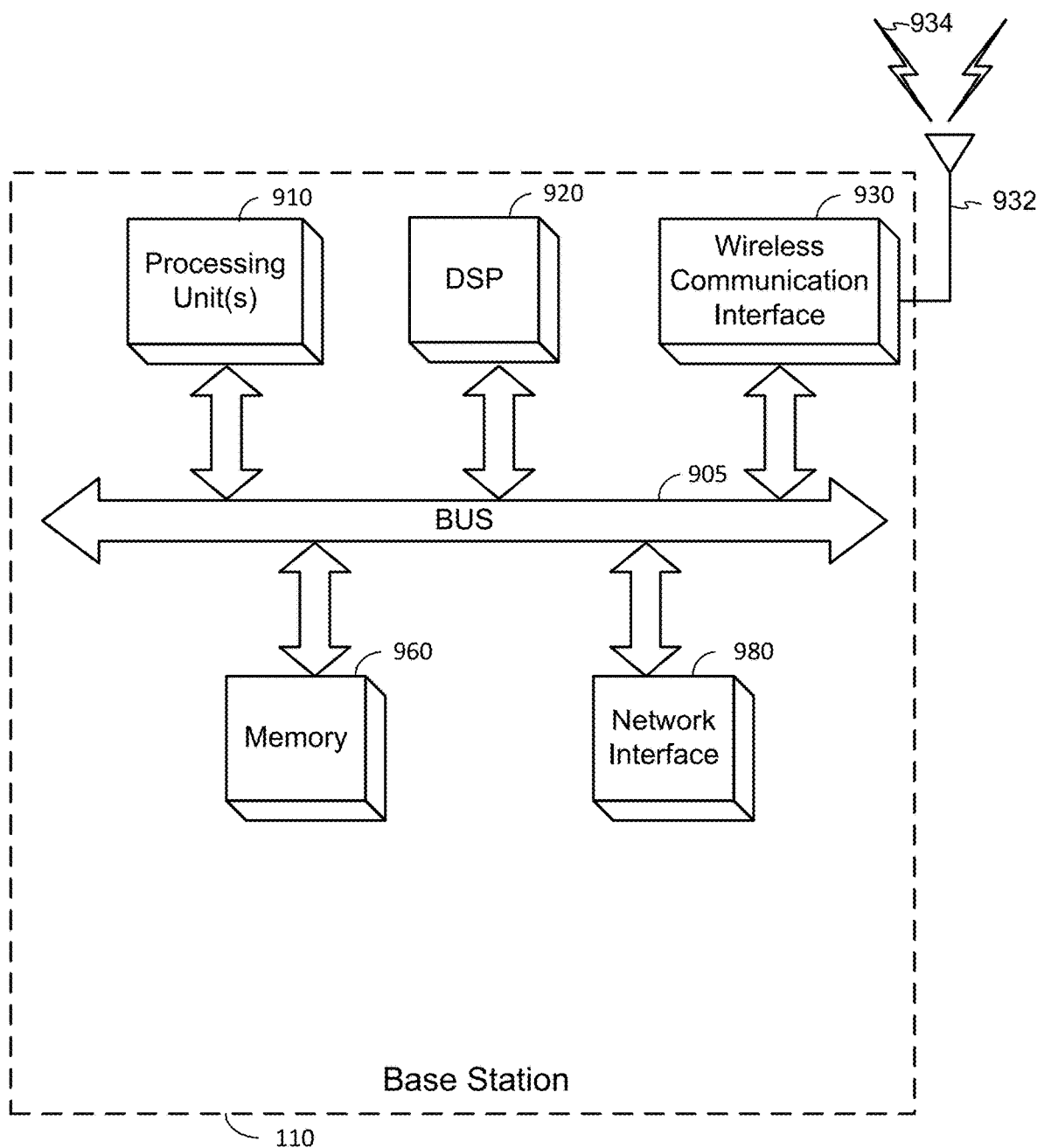
FIG. 9 is block diagram of an embodiment of a base station.

FIG. 9 illustrates an embodiment of a base station 110, which can be utilized as described herein above (e.g., in association with FIGS. 1-7). It should be noted that FIG. 9 is meant only to provide a generalized illustration of various components, any or all of which may be utilized as appropriate. In some embodiments, the base station 110 may correspond to a gNB, an ng-eNB, and/or an eNB.

The base station 110 is shown comprising hardware elements that can be electrically coupled via a bus 905 (or may otherwise be in communication as appropriate). The hardware elements may include a processing unit(s) 910, which can include, without limitation, one or more general-purpose processors, one or more special-purpose processors (such as DSP chips, graphics acceleration processors, ASICs, and/or the like), and/or other processing structure or means. As shown in FIG. 9, some embodiments may have a separate DSP 920, depending on desired functionality. Location determination and/or other determinations based on wireless communication may be provided in the processing unit(s) 910 and/or wireless communication interface 930 (discussed below), according to some embodiments. The base station 110 also can include one or more input devices, which can include, without limitation, a keyboard, display, mouse, microphone, button(s), dial(s), switch(es), and/or the like; and one or more output devices, which can include, without limitation, a display, LED, speakers, and/or the like.

The base station 110 might also include a wireless communication interface 930, which may comprise, without limitation, a modem, a network card, an infrared communication device, a wireless communication device, and/or a chipset (such as a BT device, an IEEE 802.11 device, an IEEE 802.15.4 device, a Wi-Fi device, a WiMAX device, cellular communication facilities), and/or the like, which may enable the base station 110 to communicate as described herein. The wireless communication interface 930 may permit data and signaling to be communicated (e.g., transmitted and received) with UEs, other base stations (e.g., eNBs, gNBs, and ng-eNBs), and/or other TRPs, or network components, computer systems, and/or any other electronic devices described herein. The communication can be carried out via one or more wireless communication antenna(s) 932 that send and/or receive wireless signals 934.

The base station 110 may also include a network interface 980, which can include support of wireline communication technologies. The network interface 980 may include a modem, network card, chipset, and/or the like. The network interface 980 may include one or more input and/or output communication interfaces to permit data to be exchanged with a network, communication network servers, computer systems, and/or any other electronic devices described herein.

In many embodiments, the base station 110 may further comprise a memory 960. The memory 960 can include, without limitation, local and/or network-accessible storage, a disk drive, a drive array, an optical storage device, a solid-state storage device such as a RAM, and/or a ROM, which can be programmable, flash-updateable, and/or the like. Such storage devices may be configured to implement any appropriate data stores, including, without limitation, various file systems, database structures, and/or the like.

The memory 960 of the base station 110 also may comprise software elements (not shown in FIG. 9), including an operating system, device drivers, executable libraries, and/or other code, such as one or more application programs, which may comprise computer programs provided by various embodiments, and/or may be designed to implement methods and/or configure systems, provided by other embodiments, as described herein. Merely by way of example, one or more procedures described with respect to the method(s) discussed above may be implemented as code and/or instructions in memory 960 that are executable by the base station 110 (and/or processing unit(s) 910 or DSP 920 within base station 110). In an aspect, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets), or both. Further, connection to other computing devices, such as network I/O devices, may be employed.

With reference to the appended figures, components that can include memory can include non-transitory machine-readable media. The terms "machine-readable medium" and "computer-readable medium," as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, any other physical medium with patterns of holes, a RAM, a programmable ROM (PROM), an erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves, and thus, many of the elements are examples that do not limit the scope of the disclosure to those specific examples.

It has proven convenient at times, principally for reasons of common usage, to refer to such signals as "bits," "information," "values," "elements," "symbols," "characters," "variables," "terms," "numbers," "numerals," or the like. It should be understood, however, that all of these or similar terms are to be associated with appropriate physical quantities and are merely convenient labels. Unless specifically stated otherwise, as is apparent from the discussion above, it is appreciated that throughout this Specification, discussions utilizing terms such as "processing," "computing," "calculating," "determining," "ascertaining," "identifying," "associating," "measuring," "performing," or the like refer to actions or processes of a specific apparatus, such as a special-purpose computer or a similar special-purpose electronic computing device. In the context of this Specification, therefore, a special-purpose computer or a similar special-purpose electronic computing device is capable of manipulating or transforming signals, typically represented as physical, electronic, electrical, or magnetic quantities within memories, registers, or other information storage devices, transmission devices, or display devices of the special-purpose computer or similar special-purpose electronic computing device.

Terms "and" and "or," as used herein, may include a variety of meanings which also are expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more," as used herein, may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, or AABBCCC.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of determining a group delay of a first mobile device, the method comprising:
obtaining a first Round-Trip-Time (RTT) measurement between the first mobile device and a base station;
identifying a second mobile device within a threshold distance of the first mobile device, wherein the second mobile device has a higher bandwidth than the first mobile device;
obtaining a second RTT measurement between the second mobile device and the base station; and
determining a group delay of the first mobile device based on a difference between the first RTT measurement and the second RTT measurement.

2. The method of claim 1, wherein the first mobile device comprises a low-tier User Equipment (UE) having a bandwidth of less than 100 MHz, and the second mobile device comprises a premium UE having a bandwidth of 100 MHz or more.

3. The method of claim 1, wherein the first mobile device determines the group delay.

4. The method of claim 3, wherein the first mobile device further sends information indicative of the determined group delay to the base station.

5. The method of claim 3, wherein the first mobile device further sends the determined group delay to the second mobile device, and the second mobile device sends information indicative of the determined group delay to the base station.

6. The method of claim 1, wherein the second mobile device determines the group delay.

7. The method of claim 6, wherein the second mobile device further sends information indicative of the determined group delay to the base station.

8. The method of claim 1, wherein the base station determines the group delay.

9. The method of claim 1, wherein identifying the second mobile device comprises determining that a difference between a first AoA measurement by the base station of the first mobile device and a second AoA measurement by the base station of the second mobile device is within a threshold value.

10. The method of claim 1, wherein identifying that the second mobile device comprises performing a scan of available devices by the first mobile device.

11. The method of claim 10, wherein identifying the second mobile device further comprises receiving a user selection of the second mobile device from a list of a plurality of mobile devices detected from the scan.

12. A device comprising: a transceiver; a memory; and one or more processing units communicatively coupled with the transceiver and the memory and configured to: obtain a first Round-Trip-Time (RTT) measurement between a first mobile device and a base station; identify a second mobile device within a threshold distance of the first mobile device, wherein the second mobile device has a higher bandwidth than the first mobile device; obtain a second RTT measurement between the second mobile device and the base station; and determine a group delay of the first mobile device based on a difference between the first RTT measurement and the second RTT measurement.

13. The device of claim 12, wherein the device comprises the first mobile device.

14. The device of claim 13, further comprising a low-tier User Equipment (UE) having a bandwidth of less than 100 MHz.

15. The device of claim 13, wherein the one or more processing units are further configured to cause the transceiver to send information indicative of the determined group delay to the base station.

16. The device of claim 13, wherein the one or more processing units are further configured to cause the transceiver to send the determined group delay to the second mobile device.

17. The device of claim 12, wherein the device comprises the second mobile device.

18. The device of claim 17, wherein the second mobile device further sends information indicative of the determined group delay to the base station.

19. The device of claim 17, further comprising a premium UE having a bandwidth of 100 MHz or more.

20. The device of claim 12, wherein the device comprises the base station.

21. The device of claim 12, wherein, to identify the second mobile device, the one or more processing units are configured to determine that a difference between a first AoA measurement by the base station of the first mobile device and a second AoA measurement by the base station of the second mobile device is within a threshold value.

22. The device of claim 12, wherein, to identify the second mobile device, the one or more processing units are configured to perform a scan of available devices by the first mobile device.

23. The device of claim 22, wherein, to identify the second mobile device, the one or more processing units are configured to receive a user selection of the second mobile device from a list of a plurality of mobile devices detected from the scan.

* * * * *